(12) United States Patent
Lu et al.

(10) Patent No.: US 11,593,607 B2
(45) Date of Patent: Feb. 28, 2023

(54) METHOD AND SYSTEM FOR PREDICTING CONTENT OF MULTIPLE COMPONENTS IN RARE EARTH EXTRACTION PROCESS

(71) Applicant: East China Jiaotong University, Jiangxi (CN)

(72) Inventors: Rongxiu Lu, Nanchang (CN); Quanheng He, Nanchang (CN); Hui Yang, Nanchang (CN); Jianyong Zhu, Nanchang (CN); Gang Yang, Nanchang (CN); Fangping Xu, Nanchang (CN)

(73) Assignee: East China Jiaotong University

( * ) Notice: Subject to any disclaimer, the term of this patent is extended or adjusted under 35 U.S.C. 154(b) by 781 days.

(21) Appl. No.: 16/564,430

(22) Filed: Sep. 9, 2019

(65) Prior Publication Data
US 2020/0394494 A1  Dec. 17, 2020

(30) Foreign Application Priority Data
Jun. 17, 2019 (CN) .......................... 201910519815.3

(51) Int. Cl.
G06N 3/04 (2006.01)
C22B 59/00 (2006.01)
G06N 3/086 (2023.01)

(52) U.S. Cl.
CPC ............... *G06N 3/04* (2013.01); *G06N 3/086* (2013.01); *C22B 59/00* (2013.01)

(58) Field of Classification Search
CPC ................................. G06N 3/086; C22B 59/00
See application file for complete search history.

(56) References Cited

U.S. PATENT DOCUMENTS

| 10,712,262 | B1 * | 7/2020 | Lu ............................. G06T 7/11 |
| 11,214,850 | B2 * | 1/2022 | Yang ....................... G06N 3/049 |
| 2018/0243800 | A1 * | 8/2018 | Kumar .................... G06N 20/00 |

OTHER PUBLICATIONS

Wang et al., "Testing Methods of Component Contents During Rare-Earth Extraction Process Based on Image Feature Retrieval", Nov. 2014, Journal of Computers, vol. 9 No. 11. pp. 2697-2703 (Year: 2014).*

Lu et al., "Soft Measurement for Component Content Based on Adaptive Model of Pr/Nd Color Features", 2015, Chinese Journal of Chemical Engineering, vol. 23, pp. 1981-1986. (Year: 2015).*

* cited by examiner

*Primary Examiner* — Paulinho E Smith

(57) ABSTRACT

Described is a method for predicting multiple components' content in a case that rare earth ions with and without color feature coexist, and relates to component content prediction in rare earth extraction process. It is difficult to quickly/accurately detect component's content in rare earth extraction process. Because of relatively large difference between images' color features of CePr/Nd mixed solution with colorless Ce ions and Pr/Nd solution, detecting content method of single rare earth element based on color feature is no longer applicable. The method includes: first searching for H and S components with maximum correlation with component content in HSI color space; establishing ELM based multi-component content soft measurement model using H and S component first-order moment as input; and for uncertainty of initial weight and ELM (extreme learning machine) model's threshold, optimizing model parameters using genetic algorithm GA to optimize ELM model for component content prediction higher precision.

6 Claims, 6 Drawing Sheets

METHOD AND SYSTEM FOR PREDICTING CONTENT OF MULTIPLE COMPONENTS IN RARE EARTH EXTRACTION PROCESS

CROSS REFERENCE TO RELATED APPLICATIONS

This application claims priority from Chinese application number 201910519815.3, filed Jun. 17 2019, the disclosure of which is hereby incorporated herein by reference.

TECHNICAL FIELD

The present invention relates to the field of component content measurement, and in particular, to a method and a system for predicting content of multiple components in a rare earth extraction process.

BACKGROUND

Rare earth is composed of 17 elements such as lanthanide elements, scandium, and yttrium, and exists in a form of intergrown ore. Rare earth elements are purified mainly by using a cascade extraction separation technology. In a rare earth cascade extraction process, some rare earth ions have a special color features that are closely related to content of rare earth components. For color features of praseodymium ions and neodymium ions in an extraction and production process of praseodymium/neodymium, some scholars adopt a machine vision technology to implement soft measurement of component content in an actual production process, and have developed a machine vision based system for rapidly detecting content of rare earth components and applied the system to the rare earth extraction industry. However, all these processes are conducted by using a rare earth extraction solution with feature colors of ions as a research object, and but not involve the content detection of rare earth mixed solution under the coexistence of rare earth ions with and without characteristic colors. However, a large part of extraction and production processes of rare earth separation enterprises are conducted in a case that rare earth ions with a characteristic color and rare earth ions without a characteristic color coexist. Currently, a cerium praseodymium/ neodymium rare earth mixed solution in which rare earth ions with a characteristic color and rare earth ions without a characteristic color coexist belongs to such case. In addition, to study and implement content detection of multiple components of a rare earth mixed solution in which rare earth ions with a characteristic color and rare earth ions without a characteristic color coexist is of great practical significance to automatic control of a rare earth extraction and separation process.

SUMMARY

An object of the present invention is to provide a method and a system for predicting content of multiple components in a rare earth extraction process, to obtain component content of three elements, that is, cerium praseodymium/ neodymium, in a rare earth solution in which rare earth ions with a characteristic color and rare earth ions without a characteristic color coexist, to meet an on-site detection requirement of a rare earth separation enterprise.

To achieve the above purpose, the present invention provides the following technical solution.

A method for predicting content of multiple components in a rare earth extraction process includes:

obtaining color characteristic values, in different color space, of an image of a cerium praseodymium/neodymium mixed solution in which rare earth ions with a color feature and rare earth ions without a color feature coexist;

determining, in the different color space according to the color characteristic values of the image of the cerium praseodymium/neodymium mixed solution and known content of cerium praseodymium/neodymium components, HSI color feature components with a maximum correlation;

obtaining an H and S component first-order moment with a maximum correlation in the HSI color feature components;

establishing an extreme learning machine based multi-component content soft measurement model by using the H and S component first-order moment as input and by using the known content values of the cerium praseodymium/ neodymium components as output;

optimizing an initial weight matrix and a hidden-layer threshold matrix of the extreme learning machine based multi-component content soft measurement model to obtain a genetic algorithm-extreme learning machine based multi-component content soft measurement model; and determining, according to the genetic algorithm-extreme learning machine based multi-component content soft measurement model, content values of multiple elements in a to-be-detected rare earth mixed solution by using the H and S component first-order moment as input.

Optionally, the extracting, in different color space color, color characteristic values of an image of a cerium praseodymium/neodymium mixed solution in which rare earth ions with a color feature and rare earth ions without a color feature coexist specifically includes:

obtaining, by using a machine vision technology, the image of the cerium praseodymium/neodymium mixed solution in which rare earth ions with a color feature and rare earth ions without a color feature coexist; and obtaining the color characteristic values of the image of the cerium praseodymium/neodymium mixed solution image in the different color space based on the image of the cerium praseodymium/neodymium mixed solution.

Optionally, the extreme learning machine based multi-component content soft measurement model is specifically represented as follows:

the extreme learning machine based multi-component content soft measurement model includes an input layer, a hidden layer, and an output layer;

when an input sample is given, a matrix calculation formula of a hidden-layer neuron output is $H=g(WX^T+b)$, where H is the hidden-layer neuron output; g is an activation function of a hidden-layer neuron; X is the H and S component first-order moment; W is a weight matrix between the output layer and the hidden layer; and b is a hidden-layer neuron threshold matrix; and a calculation formula of a neural network output is $P=(H^T\beta)$, where $\beta$ is a weight matrix from the hidden layer to the output layer; an ELM model can be uniquely determined provided that $\beta$ is determined; and when an output sample Y is given, the weight matrix can be solved by using $$\min_{\beta} \|H^T\beta - Y\|,$$

and a solution of the weight matrix is $\hat{\beta}=(H^T)^+Y$, where $(H^T)^+$ is a pseudo-inverse matrix of a transposed matrix $H^T$.

Optionally, the optimizing an initial weight matrix and a hidden-layer threshold matrix of the extreme learning machine based multi-component content soft measurement model to obtain a genetic algorithm-extreme learning machine based multi-component content soft measurement model specifically includes:

using the first-order moments of the H component and the S component and the known content of the cerium praseodymium/neodymium component as training set data and test set data;

conducting normalization processing on the training set data and the test set data;

optimizing, according to the training set data and the test set data having undergone normalization processing, the weight matrix between the output layer and the hidden layer and the hidden-layer threshold matrix by using a genetic algorithm, to obtain an optimal weight between the output layer and the hidden layer and an optimal hidden-layer threshold;

determining both an optimal weight between the output layer and the hidden layer and an optimal hidden-layer neuron threshold by using the genetic algorithm, and assigning the optimal weight and the optimal hidden-layer neuron threshold to an extreme learning machine as an initial weight and a threshold, and setting a number of hidden-layer nodes; and determining the genetic algorithm-extreme learning machine based multi-component content soft measurement model by using the initial weight, the threshold, and the hidden-layer node.

A system for predicting content of multiple components in a rare earth extraction process includes:

a color characteristic value obtaining module, configured to obtain color characteristic values, in different color space, of an image of a cerium praseodymium/neodymium mixed solution in which rare earth ions with a color feature and rare earth ions without a color feature coexist;

an HSI color feature component determining module, configured to determine, in the different color space according to the color characteristic values of the image of the cerium praseodymium/neodymium mixed solution and known content of cerium praseodymium/neodymium components, HSI color feature components with a maximum correlation;

an H and S component first-order moment obtaining module, configured to obtain an H and S component first-order moment with a maximum correlation in the HSI color feature components;

extreme learning machine based multi-component content soft measurement model construction module, configured to establish an extreme learning machine based multi-component content soft measurement model by using the H and S component first-order moment as input and by using the known content values of the cerium praseodymium/neodymium components as output;

a genetic algorithm-extreme learning machine based multi-component content soft measurement model construction module, configured to optimize an initial weight and a hidden-layer threshold of the extreme learning machine based multi-component content soft measurement model to obtain a genetic algorithm-extreme learning machine based multi-component content soft measurement model; and a multi-component content determining module, configured to determine, according to the genetic algorithm-extreme learning machine based multi-component content soft measurement model, content of multiple components in a to-be-detected rare earth mixed solution by using the H and S component first-order moment as input.

Optionally, the color characteristic value obtaining module specifically includes:

a solution image obtaining unit, configured to obtain, by using a machine vision technology, the image of the cerium praseodymium/neodymium mixed solution in which rare earth ions with a color feature and rare earth ions without a color feature coexist; and a color characteristic value determining unit, configured to extract the color characteristic values of the image of the cerium praseodymium/neodymium mixed solution image in the different color space based on the image of the cerium praseodymium/neodymium mixed solution.

According to specific embodiments provided in the present invention, the present invention discloses the following technical effects:

In the foregoing method of the present invention, a color characteristic value of an image of a cerium praseodymium/neodymium mixed solution and a color characteristic value of an image of a praseodymium/neodymium mixed solution are compared in same color space, and a difference between the color characteristic values of the two images is determined; it is determined, according to the difference between the color characteristic values of the images of the two mixed solutions, that a complex model is required to detect content of multiple components; an extreme learning machine based multi-component content soft measurement model is constructed, and an initial weight matrix and a hidden-layer threshold matrix of the extreme learning machine based multi-component content soft measurement model are optimized to further obtain a genetic algorithm-extreme learning machine based multi-component content soft measurement model, so as to obtain content of three elements, that is, cerium praseodymium/neodymium, in a rare earth solution in which rare earth ions with a feature color and rare earth ions without a feature color coexist, to meet an on-site detection requirement of a rare earth separation enterprise. In this way, a defect that a prior-art method cannot be used for detecting content of components in a rare earth mixed solution in which rare earth ions with a feature color and rare earth ions without a feature color coexist is overcome. In addition, component content is predicted by using an optimized measurement model, so as to greatly improve the final prediction accuracy.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An object of the present invention is to provide a method and a system for predicting content of multiple components in a rare earth extraction process, to obtain content of three elements, that is, cerium praseodymium/neodymium, in a rare earth solution in which rare earth ions with a characteristic color and rare earth ions without a characteristic color coexist, to meet an on-site detection requirement of a rare earth separation enterprise.

To make the foregoing objective, features, and advantages of the present invention clearer and more comprehensible, the present invention is further described in detail below with reference to the accompanying drawings and specific embodiments.

Figure 1:
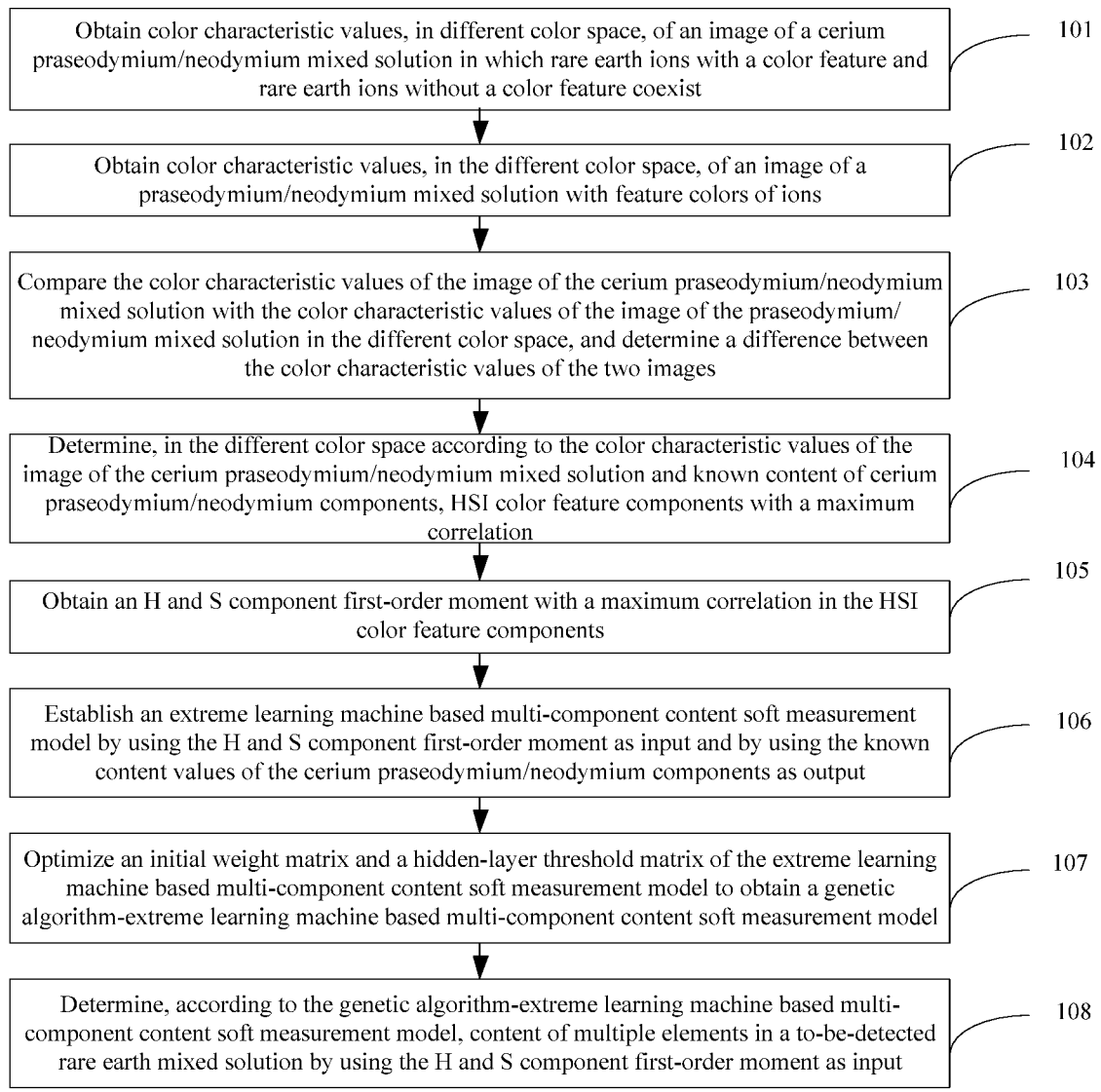
FIG. 1 is a flowchart of a method for predicting content of multiple components in a rare earth extraction process according to an embodiment of the present invention.

FIG. 1 is a flowchart of a method for predicting content of multiple components in a rare earth extraction process according to an embodiment of the present invention. As shown in FIG. 1, the prediction method includes the following steps:

Step 101: Obtain color characteristic values, in different color space, of an image of a cerium praseodymium/neodymium mixed solution in which rare earth ions with a color feature and rare earth ions without a color feature coexist.

Step 102: Obtain color characteristic values, in the different color space, of an image of a praseodymium/neodymium mixed solution with feature colors of ions.

Step 103: Compare the color characteristic values of the image of the cerium praseodymium/neodymium mixed solution with the color characteristic values of the image of the praseodymium/neodymium mixed solution in the different color space, determine a difference between color characteristic values of the two images in same color space, and select a more complex model based on the difference to predict content of multiple components subsequently.

Specifically, in step 103, because there is a relatively large difference between color features of the images of the CePr/Nd mixed solution and the Pr/Nd solution, an original method for detecting content of a single rare earth element based on a color feature is no longer applicable. Therefore, a more complex model, that is, a GA-ELM model, needs to be selected to predict content of multiple components.

Step 104: Determine, in the different color space according to the color characteristic values of the image of the cerium praseodymium/neodymium mixed solution and known content of cerium praseodymium/neodymium components, HSI color feature components with a maximum correlation.

Step 105: Obtain an H and S component first-order moment with a maximum correlation in the HSI color feature components.

Step 106: Establish an extreme learning machine based multi-component content soft measurement model by using the H and S component first-order moment as input and by using the known content values of the cerium praseodymium/neodymium components as output.

Step 107: Optimize an initial weight matrix and a hidden-layer threshold matrix of the extreme learning machine based multi-component content soft measurement model to obtain a genetic algorithm-extreme learning machine based multi-component content soft measurement model.

Step 108: Determine, according to the genetic algorithm-extreme learning machine based multi-component content soft measurement model, content of multiple elements in a to-be-detected rare earth mixed solution by using the H and S component first-order moment as input.

Specifically, in step 101, the image of the cerium praseodymium/neodymium mixed solution in which rare earth ions with a color feature and rare earth ions without a color feature coexist is first obtained by using a machine vision technology; and then the color characteristic values of the image of the cerium praseodymium/neodymium mixed solution image are extracted in the different color space based on the image of the cerium praseodymium/neodymium mixed solution.

Specifically, in step 102, the image of the praseodymium/neodymium mixed solution with feature colors of ions is first obtained by using the machine vision technology; and then the color characteristic values of the image of the praseodymium/neodymium mixed solution image are extracted in the different color space based on the image of the praseodymium/neodymium mixed solution.

The following describes image collection and feature extraction processes of a rare earth solution in detail:

Rare earth solution samples in different working conditions are collected from different extraction tanks in a production field of a rare earth separation enterprise; rare earth solution samples collected from the field are divided into two parts by using a CePr/Nd rare earth mixed solution in which rare earth ions with a color feature and rare earth ions without a color feature coexist as a research object, where one part is used for Comparative Test, and a machine vision technology is used to distinguish a color feature difference between an image of the CePr/Nd mixed solution in which ions with a color feature and ions without a color feature coexist and an image of a Pr/Nd mixed solution with a color feature. After it is verified that there is impact of rare earth Ce ions without a color feature on a color feature of the Pr/Nd solution with the color feature, another part of rare earth mixed solutions collected is photographed in a laboratory condition; preprocessing such as image segmentation and filtering is conducted on a selected clear image of a CePr/Nd solution captured by a camera, a processed image is stored in a memory of a computer, so as to complete an image collection process of a rare earth solution.

A color feature extraction method of a rare earth solution image is as follows:

Because components of a rare earth solution in an extraction tank are variable, color features of ions are different. To extract color features of an image of a mixed solution, first, according to ion color features of to-be-detected rare earth elements, an H color feature component and an S color feature component with a maximum correlation with a content relationship of CePr/Nd components are extracted in different color space (for example, RGB (R represents red, G represents green, and B represents blue), HSI (H represents hue, S represents saturation, and I represents intensity), and LAB (L represents luminance, and A and B represent two color channels) from an image of a rare earth mixed solution containing information about content of multiple rare earth elements, and then an H and S color feature component first-order moment of an image of a CePr/Nd rare earth mixed solution. This lays a foundation for establishment of a multi-component content prediction model based on color features of ions.

Specifically, in step 106, the known content values of the cerium praseodymium/neodymium components are values directly obtained from an off-line laboratory of a rare earth separation company through test.

The extreme learning machine based multi-component content soft measurement model is specifically represented as follows:

$H = g(WX^T + b)$, where H is a hidden-layer neuron output; g is an activation function of a hidden-layer neuron; X is the H and S component first-order moment; W is a weight matrix between an output layer and a hidden layer; and b is a hidden-layer threshold.

A calculation formula of a neural network output is $P = (H^T \beta)$, where $\beta$ is a weight matrix from the hidden layer to the output layer; and an ELM model can be uniquely determined provided that $\beta$ is determined. When an output sample Y is given, the weight matrix can be solved by using $$\min_{\beta} \|H^T \beta - Y\|,$$

and a solution of the weight matrix is $\hat{\beta} = (H^T)^+ Y$, where $(H^T)^+$ is a pseudo-inverse matrix of a transposed matrix $H^T$.

An extreme learning machine (ELM) is a special feed forward neural network model with a single hidden layer. An input-layer weight matrix and a hidden-layer threshold matrix in the ELM are randomly generated, and do not need to be adjusted in a subsequent operation. It can be learned according to the theory that, a unique optimal solution can be obtained only by setting a number of hidden-layer nodes.

A neural network output value is $P = (H^T \beta)$.

In the formula, P is a neural network output, $\beta$ is a weight matrix from the hidden layer to the output layer; and an ELM neural network can be uniquely determined provided that $\beta$ is determined. For the given output training sample Y, if the output sample is used to replace the network output value, the weight matrix $\beta$ can be solved according to the following formula:

$$\min_{\beta} \|H^T \beta - Y\|$$

A solution of the weight matrix is $\hat{\beta} = (H^T)^+ Y$.

In the formula, $(H^T)^+$ is a pseudo-inverse matrix of a transposed matrix $H^T$.

A connection weight between an input layer and a hidden layer and a hidden-layer neuron threshold that are of the extreme learning machine ELM are randomly given. When the connection weight and the hidden-layer neuron threshold are given, some values may be zero, so that some hidden-layer nodes become invalid. The prediction accuracy of the extreme learning machine ELM is closely related to a number of hidden-layer nodes. If hidden-layer nodes become invalid, the accuracy of predicting a sample by using a model is reduced; or if there are an excessively large number of hidden-layer nodes, overfitting occurs.

Therefore, a genetic algorithm is used to conduct optimization selection on the connection weight between the input layer and the hidden layer and the hidden-layer neuron threshold that are of the extreme learning machine ELM, so as to improve model prediction precision. It can be learned according to an ultimate principle of the ELM that, W and b can be randomly generated. Therefore, when hidden-layer nodes are the same, one training sample set is used to train the ELM model. Because W and b are randomly generated, precision of content of CePr/Nd components that is obtained through network fitting varies greatly. The genetic algorithm (GA) has a very strong global optimization capability, and the GA is used to search for optimal initial W and b for the ELM model, so as to improve fitting precision of the ELM model and obtain an optimal ELM model.

Specifically, in step 107, the optimizing an initial weight matrix and a hidden-layer threshold matrix of the extreme learning machine based multi-component content soft measurement model to obtain a genetic algorithm-extreme learning machine based multi-component content soft measurement model specifically includes:

using the H and S component first-order moment and the known content of the cerium praseodymium/neodymium component as training set data and test set data;

conducting normalization processing on the training set data and the test set data;

optimizing, according to the training set data and the test set data having undergone normalization processing, the weight matrix between the output layer and the hidden layer and the hidden-layer threshold matrix by using a genetic algorithm, to obtain an optimal weight matrix between the output layer and the hidden layer and an optimal hidden-layer threshold matrix;

determining both an optimal weight between the output layer and the hidden layer and an optimal hidden-layer threshold by using the genetic algorithm, and assigning the optimal weight and the optimal hidden-layer threshold to an extreme learning machine as an initial weight and a threshold, and setting a number of hidden-layer nodes; and determining the genetic algorithm-extreme learning machine based multi-component content soft measurement model by using the initial weight, the threshold, and the hidden-layer node.

Specifically, parameters of the genetic algorithm are set to those shown in the following table:

| Parameter item | Value (or description) |
| --- | --- |
| Number of hidden-layer nodes of the ELM | 25 |
| Population size | 20 |
| Coding mode | Binary mode |
| Number of binary bits | 10 |
| Coding length | 20 |
| Generation gap | 0.95 |
| Maximum evolution algebra | 100 |
| Selection mode | Random traversal sampling |
| Crossover mode | Single-point crossover |
| Crossover probability | 0.7 |
| Mutation manner | Discrete mutation |
| Mutation probability | 0.01 |
| Objective function | Minimum average relative error |
| Fitness assessment manner | Linear assessment |

-continued

| Parameter item | Value (or description) |
|---|---|
| Weight range | [−1 1] |
| Offset vector range | [−1 1] |
| End condition | A maximum evolution algebra is satisfied |

Figure 2:
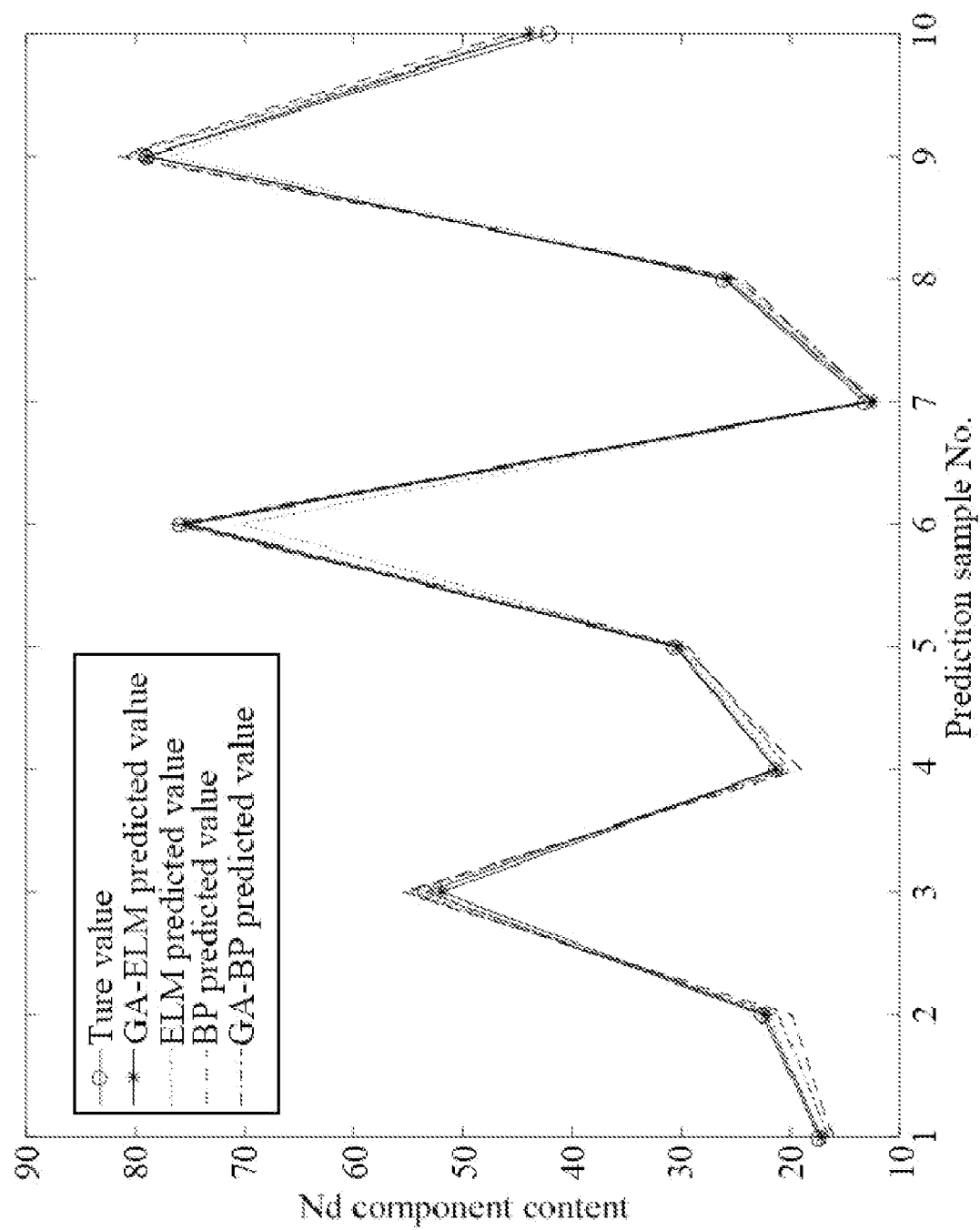
FIG. 2 is a comparison diagram of predicted values and true values of component content of Nd in four models: GA-ELM, ELM, BP, and GA-BP according to an embodiment of the present invention.

FIG. 2 is a comparison diagram of predicted values and true values of component content of Nd in four models: GA-ELM, ELM, BP, and GA-BP according to an embodiment of the present invention. As shown in FIG. 2, in the four models: GA-ELM, ELM, BP, and GA-BP, same input samples are selected, and simulation comparison is conducted on a predicted value and a true value of the input sample in each of the four models when a parameter of the model is optimum. Results show that prediction of component content of Nd in the GA-ELM model is more accurate.

Figure 3:
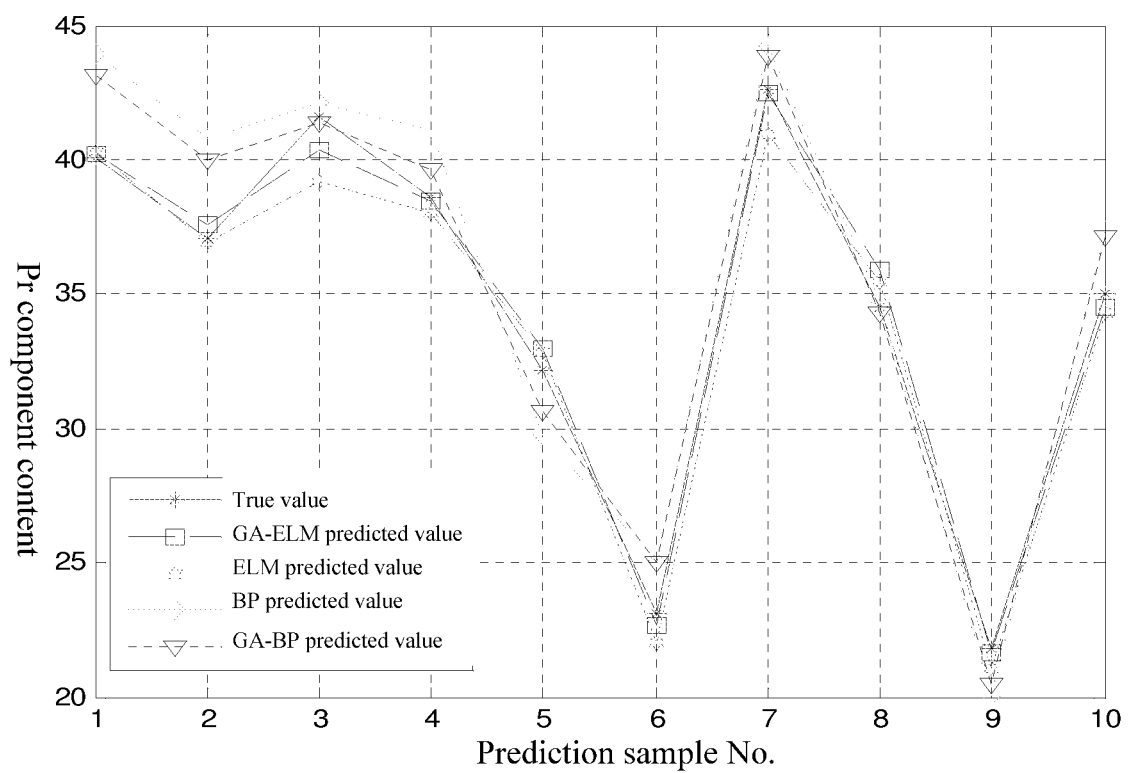
FIG. 3 is a comparison diagram of a predicted result and a true value of component content of Pr in four models: GA-ELM, ELM, BP, and GA-BP according to an embodiment of the present invention.

FIG. 3 is a comparison diagram of a predicted result and a true value of component content of Pr in four models: GA-ELM, ELM, BP, and GA-BP according to an embodiment of the present invention. As shown in FIG. 3, in the four models: GA-ELM, ELM, BP, and GA-BP, same input samples are selected, and simulation comparison is conducted on a predicted value and a true value of the input sample in each of the four models when a parameter of the model is optimum. Results show that prediction of component content of Pr in the GA-ELM model is more accurate.

Figure 4:
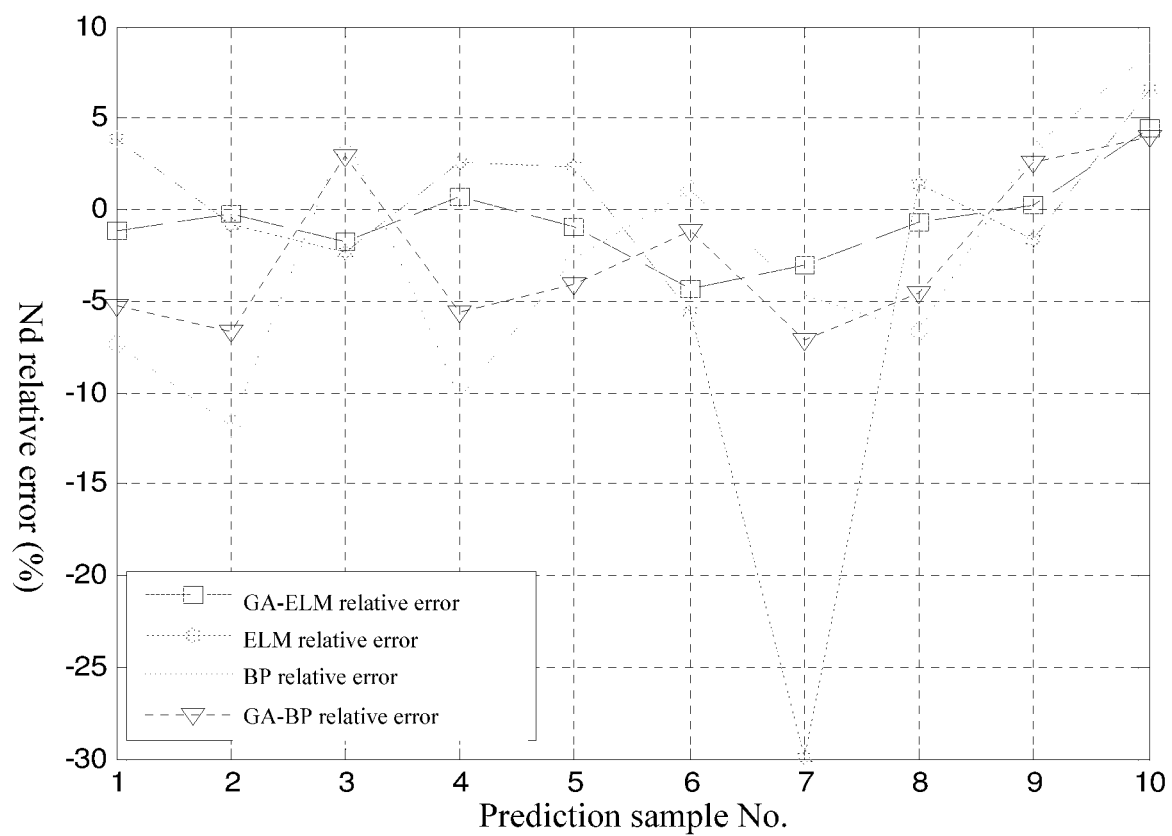
FIG. 4 is a relative error graph of component content output of Nd in four models: GA-ELM, ELM, BP, and GA-BP according to an embodiment of the present invention.

FIG. 4 is a relative error graph of component content output of Nd in four models: GA-ELM, ELM, BP, and GA-BP according to an embodiment of the present invention. As shown in FIG. 4, in the four models: GA-ELM, ELM, BP, and GA-BP, same input samples are selected, simulation comparison is conducted on a predicted value and a true value of the input sample in each of the four models when a parameter of the model is optimum, and model prediction precision is intuitively reflected by using a relative error. Results show that a relative error of component content of Nd in the GA-ELM model is smaller, and all relative errors fall within ±5%, so as to meet an enterprise production requirement.

Figure 5:
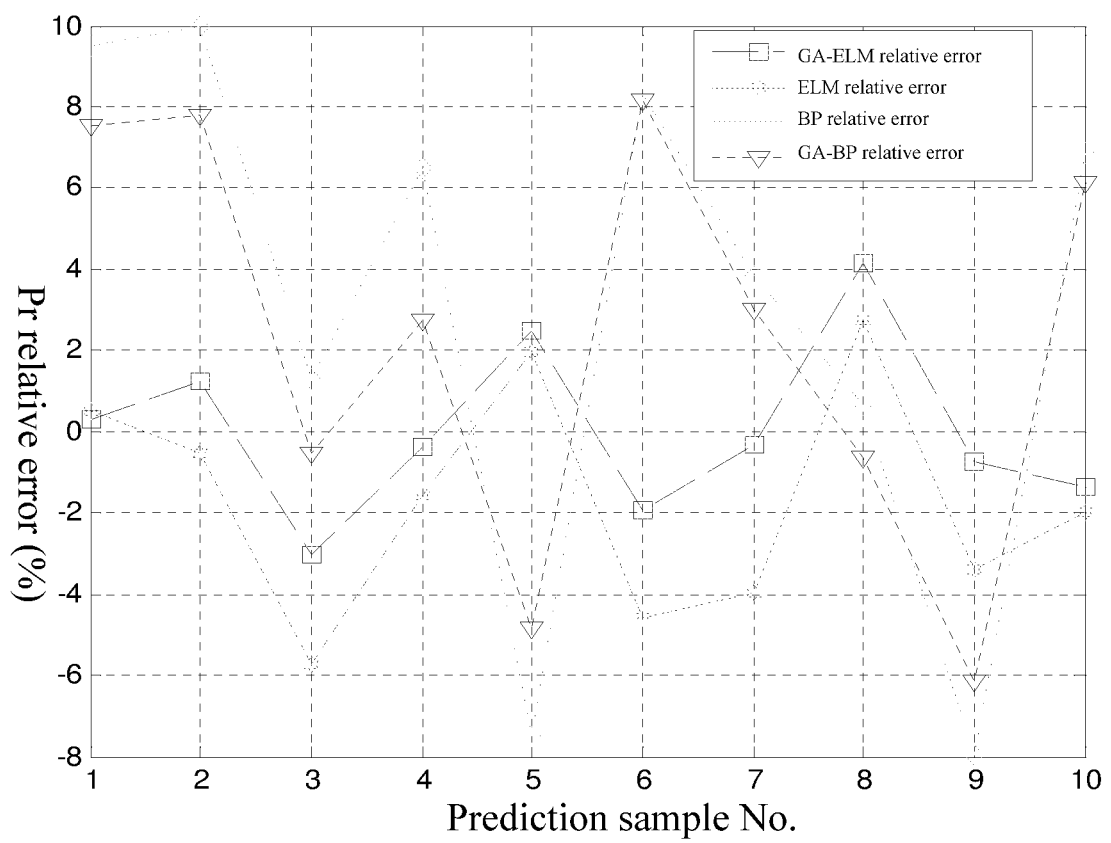
FIG. 5 is a relative error graph of component content output of Pr in four models: GA-ELM, ELM, BP, and GA-BP according to an embodiment of the present invention.

FIG. 5 is a relative error graph of component content output of Pr in four models: GA-ELM, ELM, BP, and GA-BP according to an embodiment of the present invention. As shown in FIG. 5, in the four models: GA-ELM, ELM, BP, and GA-BP, same input samples are selected, simulation comparison is conducted on a predicted value and a true value of the input sample in each of the four models when a parameter of the model is optimum, and model prediction precision is intuitively reflected by using a relative error. Results show that a relative error of component content of Pr in the GA-ELM model is smaller, and all relative errors fall within ±5%, so as to meet an enterprise production requirement.

Figure 6:
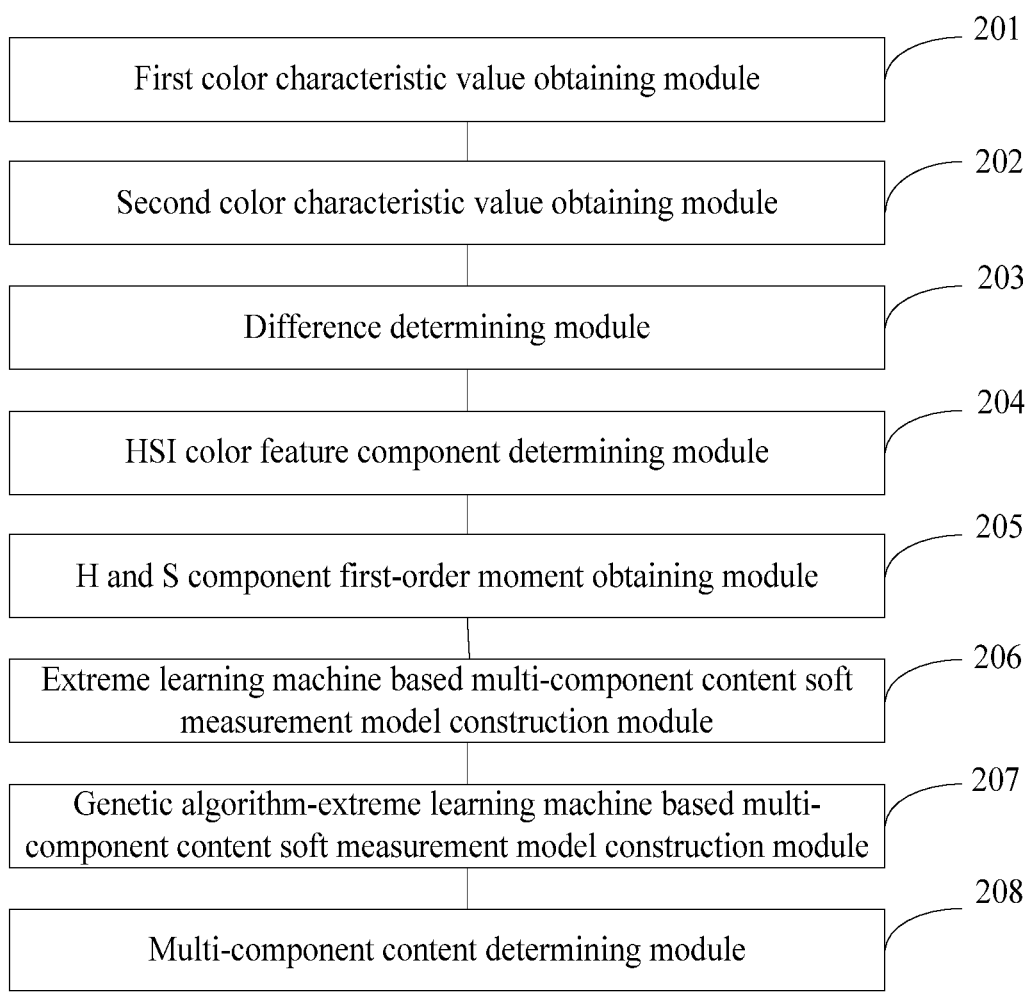
FIG. 6 is a flowchart of a system for predicting content of multiple components in a rare earth extraction process according to an embodiment of the present invention.

FIG. 6 shows a system for predicting content of multiple components in a rare earth extraction process according to an embodiment of the present invention. As shown in FIG. 6, the system includes:

The present invention further provides a system for predicting content of multiple components in a rare earth extraction process. The system includes:

a first color characteristic value obtaining module 201, configured to obtain, by using a machine vision technology, color characteristic values, in different color space, of an image of a cerium praseodymium/neodymium mixed solution in which rare earth ions with a color feature and rare earth ions without a color feature coexist;

a second color characteristic value obtaining module 201, configured to obtain, by using the machine vision technology, color characteristic values, in the different color space, of an image of a praseodymium/neodymium mixed solution with color features of ions;

a difference determining module 203, configured to compare the color characteristic values of the image of the cerium praseodymium/neodymium mixed solution with the color characteristic values of the image of the praseodymium/neodymium mixed solution in the different color space, determine a difference between color characteristic values of the two images, and select a more complex model based on the difference to predict content of multiple components subsequently;

an HSI color feature component determining module 204, configured to determine, in the different color space according to the color characteristic values of the image of the cerium praseodymium/neodymium mixed solution and known content of cerium praseodymium/neodymium components, HSI color feature components with a maximum correlation;

an H and S component first-order moment obtaining module 205, configured to obtain an H and S component first-order moment with a maximum correlation in the HSI color feature components;

an extreme learning machine based multi-component content soft measurement model construction module 206, configured to establish an extreme learning machine based multi-component content soft measurement model by using the H and S component first-order moment as input and by using the known content values of the cerium praseodymium/neodymium components as output;

a genetic algorithm-extreme learning machine based multi-component content soft measurement model construction module 207, configured to optimize an initial weight and a hidden-layer threshold of the extreme learning machine based multi-component content soft measurement model to obtain a genetic algorithm-extreme learning machine based multi-component content soft measurement model; and a multi-component content determining module 208, configured to determine, according to the genetic algorithm-extreme learning machine based multi-component content soft measurement model, content of multiple components in a to-be-detected rare earth mixed solution by using the H and S component first-order moment as input.

Specifically, the first color characteristic value obtaining module 201 specifically includes:

a first solution image obtaining unit, configured to obtain, by using a machine vision technology, the image of the cerium praseodymium/neodymium mixed solution in which rare earth ions with a color feature and rare earth ions without a color feature coexist; and a first color characteristic value determining unit, configured to extract the color characteristic values of the image of the cerium praseodymium/neodymium mixed solution image in the different color space based on the image of the cerium praseodymium/neodymium mixed solution.

Specifically, the second color characteristic value obtaining module 202 specifically includes:

a second solution image obtaining unit, configured to obtain, by using the machine vision technology, the image of the praseodymium/neodymium mixed solution with feature colors of ions; and a second color characteristic value determining unit, configured to extract the color characteristic values of the image of the praseodymium/neodymium mixed solution image in the different color space based on the image of the praseodymium/neodymium mixed solution.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A method for predicting content of multiple components in a rare earth extraction process, wherein the prediction method comprises:
    obtaining color characteristic values, in different color space, of an image of a cerium praseodymium/neodymium mixed solution in which rare earth ions with a color feature and rare earth ions without a color feature coexist;
    determining, in the different color space according to the color characteristic values of the image of the cerium praseodymium/neodymium mixed solution and known content of cerium praseodymium/neodymium components, HSI color feature components with a maximum correlation;
    obtaining an H and S component first-order moment with a maximum correlation in the HSI color feature components;
    establishing an extreme learning machine based multi-component content soft measurement model by using the H and S component first-order moment as input and by using the known content values of the cerium praseodymium/neodymium components as output;
    optimizing an initial weight matrix and a hidden-layer threshold matrix of the extreme learning machine based multi-component content soft measurement model to obtain a genetic algorithm-extreme learning machine based multi-component content soft measurement model; and
    determining, according to the genetic algorithm-extreme learning machine based multi-component content soft measurement model, content values of multiple elements in a to-be-detected rare earth mixed solution by using the H and S component first-order moment as input.

2. The method for predicting content of multiple components in a rare earth extraction process according to claim 1, wherein the extracting, in different color space color, color characteristic values of an image of a cerium praseodymium/neodymium mixed solution in which rare earth ions with a color feature and rare earth ions without a color feature coexist specifically comprises:
    obtaining, by using a machine vision technology, the image of the cerium praseodymium/neodymium mixed solution in which rare earth ions with a color feature and rare earth ions without a color feature coexist; and
    obtaining the color characteristic values of the image of the cerium praseodymium/neodymium mixed solution image in the different color space based on the image of the cerium praseodymium/neodymium mixed solution.

3. The method for predicting content of multiple components in a rare earth extraction process according to claim 1, wherein the extreme learning machine based multi-component content soft measurement model is specifically represented as follows:
    the extreme learning machine based multi-component content soft measurement model comprises an input layer, a hidden layer, and an output layer;
    when an input sample is given, a matrix calculation formula of a hidden-layer neuron output is $H=g(WX^T+b)$, wherein H is the hidden-layer neuron output; g is an activation function of a hidden-layer neuron; X is the H and S component first-order moment; W is a weight matrix between the output layer and the hidden layer; and b is a hidden-layer neuron threshold matrix; and
    a calculation formula of a neural network output is $P=(H^T\beta)$, wherein $\beta$ is a weight matrix from the hidden layer to the output layer; an ELM model can be uniquely determined provided that $\beta$ is determined; and when an output sample Y is given, the weight matrix can be solved by using $$\min_{\beta}\|H^T\beta - Y\|,$$

and a solution of the weight matrix is $\hat{\beta}=(H^T)^+Y$, wherein $(H^T)^+$ is a pseudo-inverse matrix of a transposed matrix $H^T$.

4. The method for predicting content of multiple components in a rare earth extraction process according to claim 3, wherein the optimizing an initial weight matrix and a hidden-layer threshold matrix of the extreme learning machine based multi-component content soft measurement model to obtain a genetic algorithm-extreme learning machine based multi-component content soft measurement model specifically comprises:
    using the first-order moments of the H component and the S component and the known content of the cerium praseodymium/neodymium component as training set data and test set data;
    conducting normalization processing on the training set data and the test set data;
    optimizing, according to the training set data and the test set data having undergone normalization processing, the weight matrix between the output layer and the hidden layer and the hidden-layer threshold matrix by using a genetic algorithm, to obtain an optimal weight between the output layer and the hidden layer and an optimal hidden-layer threshold;
    determining both an optimal weight between the output layer and the hidden layer and an optimal hidden-layer neuron threshold by using the genetic algorithm, and assigning the optimal weight and the optimal hidden-layer neuron threshold to an extreme learning machine as an initial weight and a threshold, and setting a number of hidden-layer nodes; and
    determining the genetic algorithm-extreme learning machine based multi-component content soft measurement model by using the initial weight, the threshold, and the hidden-layer node.

5. A system for predicting content of multiple components in a rare earth extraction process, wherein the system comprises a processor, the processor is configured to:
    obtain color characteristic values, in different color space, of an image of a cerium praseodymium/neodymium mixed solution in which rare earth ions with a color feature and rare earth ions without a color feature coexist;

determine, in the different color space according to the color characteristic values of the image of the cerium praseodymium/neodymium mixed solution and known content of cerium praseodymium/neodymium components, HSI color feature components with a maximum correlation;

obtain an H and S component first-order moment with a maximum correlation in the HSI color feature components;

establish an extreme learning machine based multi-component content soft measurement model by using the H and S component first-order moment as input and by using the known content values of the cerium praseodymium/neodymium components as output;

optimize an initial weight and a hidden-layer threshold of the extreme learning machine based multi-component content soft measurement model to obtain a genetic algorithm-extreme learning machine based multi-component content soft measurement model; and determine, according to the genetic algorithm-extreme learning machine based multi-component content soft measurement model, content of multiple components in a to-be-detected rare earth mixed solution by using the H and S component first-order moment as input.

6. The system for predicting content of multiple components in a rare earth extraction process according to claim 5, the system further comprises a camera, wherein the camera is configured to obtain, by using a machine vision technology, the image of the cerium praseodymium/neodymium mixed solution in which rare earth ions with a color feature and rare earth ions without a color feature coexist; and the processor is further configured to extract the color characteristic values of the image of the cerium praseodymium/neodymium mixed solution image in the different color space based on the image of the cerium praseodymium/neodymium mixed solution.

\* \* \* \* \*